United States Patent [19]

Haeg et al.

[11] Patent Number: 4,798,088
[45] Date of Patent: Jan. 17, 1989

[54] VEHICLE RESTRAINT SYSTEM

[75] Inventors: Steven R. Haeg, Shorewood; Mark T. Kraabel, Minneapolis, both of Minn.

[73] Assignee: MTS Systems Corporation, Eden Prairie, Minn.

[21] Appl. No.: 170,757

[22] Filed: Mar. 21, 1988

[51] Int. Cl.[4] ............................................ G01M 17/00
[52] U.S. Cl. ....................................... 73/669; 248/634
[58] Field of Search .................... 73/669, 865.6, 118.1; 248/634

[56] References Cited

U.S. PATENT DOCUMENTS

| | | | |
|---|---|---|---|
| 2,072,019 | 2/1937 | Atti et al. | 73/669 |
| 3,713,330 | 1/1973 | Lentz | 73/93 |
| 3,827,289 | 8/1974 | Borg | 73/669 |
| 4,263,809 | 4/1981 | Petersen et al. | 73/798 |

Primary Examiner—Jerry W. Myracle
Attorney, Agent, or Firm—Kinney & Lange

[57] ABSTRACT

A restraint and guidance system for testing vehicles has members on opposite sides of the vehicle which are secured to the vehicle, and a linkage member that permits the vehicle to move freely in the vertical, roll and pitch directions but which restrains movement in logitudinal direction of the vehicle. This permits the vehicle to move vertically freely, and to be rolled and pitched as guided by linkages that are completely decoupled from each other. The restraint system can be connected to actuators for controlling lateral loads. The kinematic paths of the linkage for reacting the loads are the same as if the vehicle body was inertially restrained, that is, acutaly moving in space during testing.

11 Claims, 3 Drawing Sheets

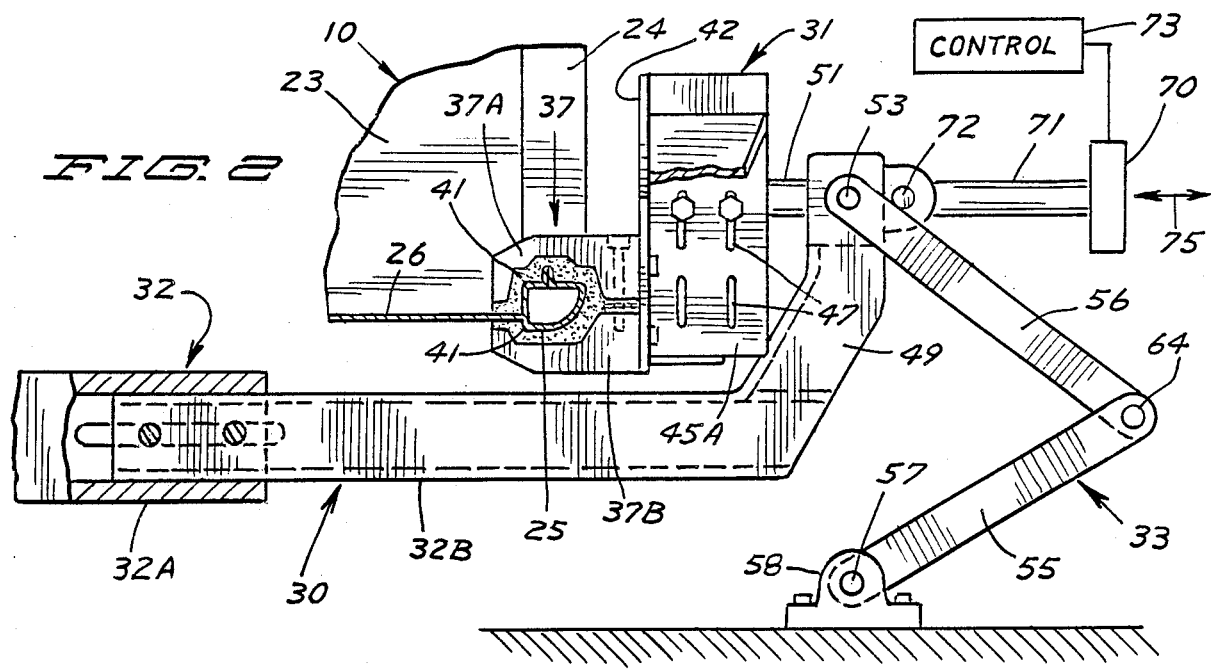
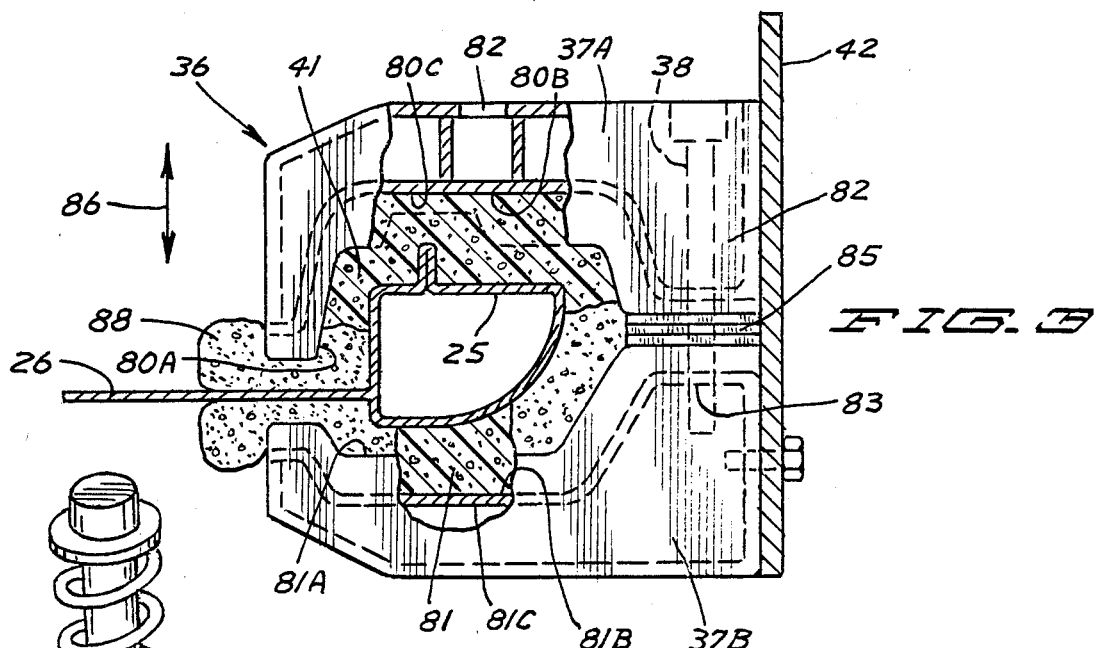
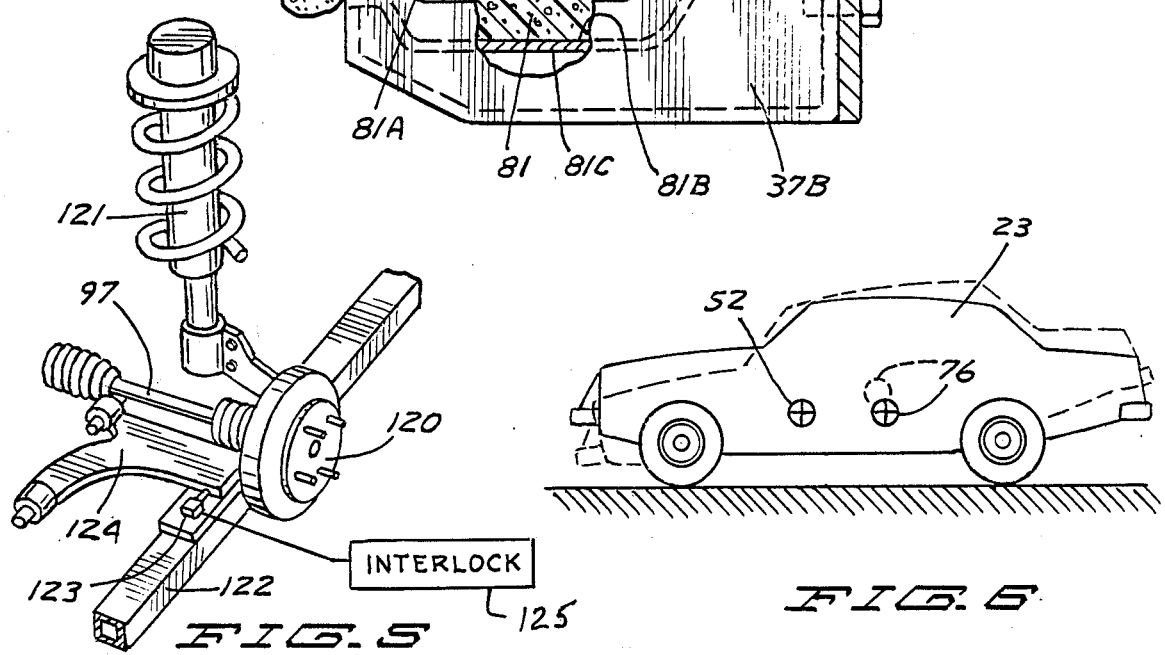

4,798,088

VEHICLE RESTRAINT SYSTEM

BACKGROUND OF THE INVENTION

1. Field of the Invention

The present invention relates to system for permitting simulating inertial loading on vehicle bodies undergoing testing.

2. Description of the Prior Art

Simulated vehicle testings in laboratory applications has greatly improved automobile reliability by being able to simulate road loading and provide an adequate test in a short time. Apparatus for loading the individual axles or spindles of a vehicle is shown in U.S. Pat. No. 4,263,809, issued Apr. 28, 1981, which illustrates a linkage that supports an entire vehicle. U.S. Pat. No. 3,713,330, discloses a pioneer test device for permitting three axis input loads to be applied to a vehicle spindle and simulate the load on the tire.

In addition, applying braking loads have been advanced utilizing substantially the same fixtures or types of fixtures. The present invention relates to a restraint that can be placed on the body to permit simulating inertial loading on the vehicle.

SUMMARY OF THE INVENTION

The present invention relates to a restraint system for vehicle bodies that are mounted in test fixtures of various kinds wherein the individual wheel spindles are being loaded. In one form of the invention the loads are applied through linkages that apply loads through spindle or axle adaptor plates which permit loading each axle, or in another form of the invention, loads are applied by mounting the entire vehicle on drum testers.

When a vehicle is being loaded as it is moving at a velocity, the vehicle has certain inertia that causes loads back to the vehicle body. For example, going around a cloverleaf turn, the vehicle body provides an inertial reaction back to the wheel spindles from the load being applied at the tire patch. In laboratory tests this cannot be simulated with conventional equipment unless the vehicle and the test apparatus are actually being moved at the same time in order to simulate the inertial loading.

While some test devices restrain the vehicle body through the vehicle sills, this generally applies the type of loading that is not a true simulation of inertial forces and also will tend to load the sills with forces acting in directions that the sills were not intended to react (such as bending). This can cause failure of the sills and tests that do not fully simulate actual loading conditions.

In the present device, a very rigid torque tube is mounted beneath the vehicle body, and is coupled to clamping assemblies on opposite sides of the body. The clamping assemblies each have two sets of longitudinally spaced sill clamps that will clamp onto the longitudinally extending sill members of a vehicle, which has the doors removed.

The sill clamps can be replaced with alternative attachment means, for example, a member can be cemented to the sill exterior surface with the doors in place or attachments can be made to the door mounting structure if the doors are removed.

The clamp assemblies, and the torque tube, are mounted onto folding (scissor) linkages on opposite sides of the vehicle, which restrain movement in the longitudinal direction of the vehicle, but which permit free vertical and side to side motion, unless independent restraints are placed on the clamp assemblies. This permits the vehicle to respond as it would if it was inertially reacting loads. The body is completely free and unrestrained in vertical direction, and in pitch. That is, the ability of the vehicle body to pivot around a transverse axis passing through the body is unrestrained.

Lateral motion of the vehicle body can be free or restrained by servocontrolled actuators if desired, depending on the circumstances that are being simulated. The body and the clamps are fixed in respect to longitudinal movement. This longitudinal restraint is of primary interest because when braking is simulated, it can be done with the vehicle body fixed in space. The sills of a vehicle are strong in shear, and this is the direction of restraint of the present assembly. The ability of the vehicle body to 'rack' as would occur if one of the wheels hits a pothole on the road, is likewise not restrained or affected by the mounting.

In a modified form of the invention, the assembly is used for mounting a vehicle on a pair of rotating drums at the front and rear of the vehicle which simulate different road surfaces, and in such an instance, lateral restraints are desired and are illustrated in the present invention.

The linkage is relatively simple, but does enhance the testing of a vehicle by permitting simulation of inertial loading on the vehicle body during the test sequence.

BRIEF DESCRIPTION OF THE DRAWINGS

FIG. 2 is a vertical sectional view through a clamp assembly on one side of the vehicle in the restraint of the present invention and showing the restraint linkage in position, with an optional lateral restraint also shown;

FIG. 3 is an enlarged sectional view illustrating the forming of a clamp for the sills of a vehicle to be tested in accordance with the present invention;

FIG. 5 is a schematic fragmentary view showing a safety switch assembly used with the device of FIG. 4; and FIG. 6 is a schematic representation of the change in vehicle position during braking, which causes a pitching of the vehicle.

DETAILED DESCRIPTION OF THE PREFERRED EMBODIMENTS

Figure 1:
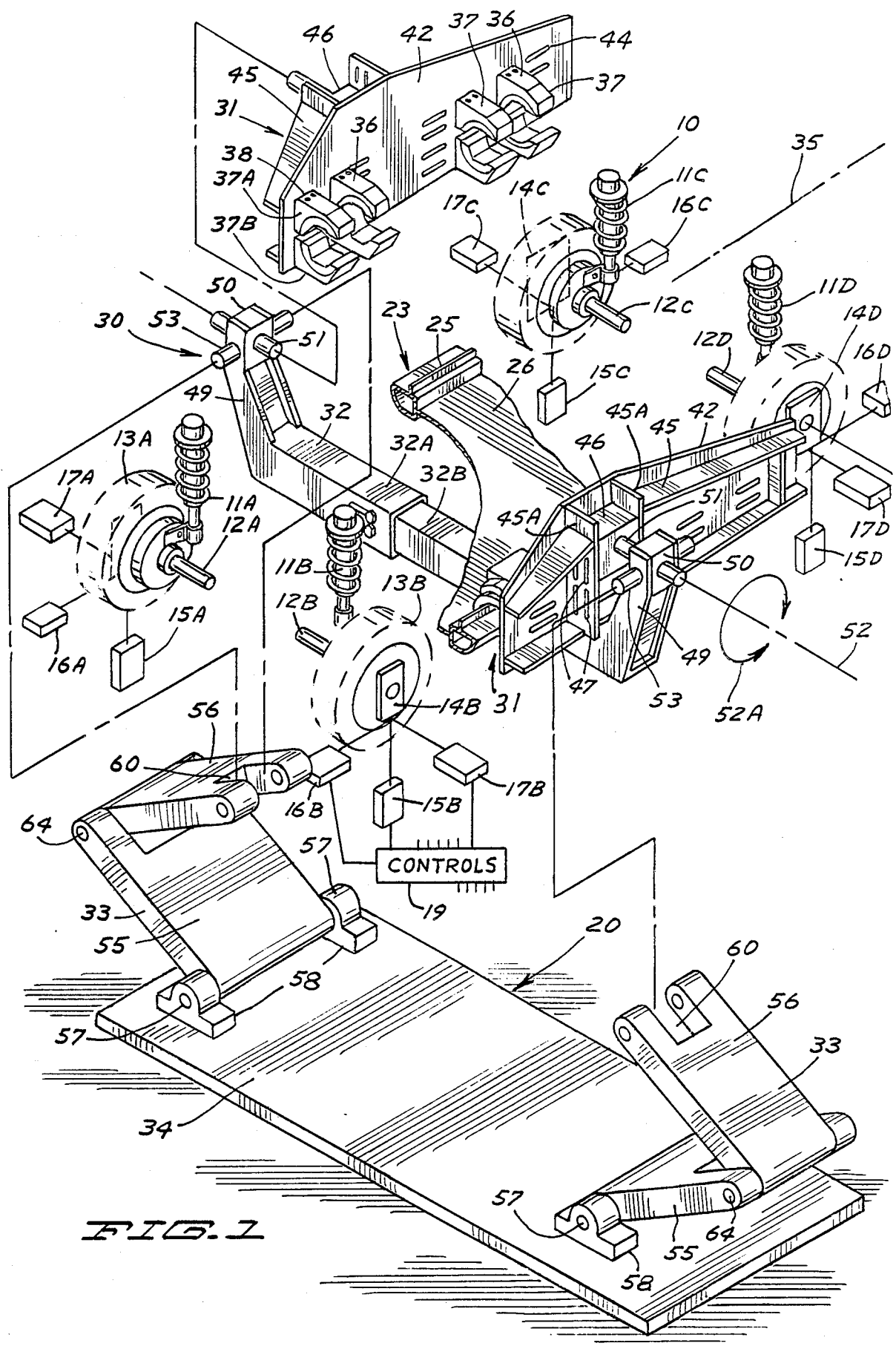
FIG. 1 is an exploded perspective view of an automobile restraint made according to the present invention.

Referring to FIGS. 1, 2 and 3 initially, a restraint system for a vehicle being tested is shown schematically. The methods of and apparatus for loading described in the previously mentioned U.S. Pat. Nos. 3,713,330 and 4,263,809 are illustrated schematically. A vehicle illustrated fragmentarily at 10 (the independent, or individual axle support strut assemblies are shown schematically) includes four axle and wheel support assemblies 11A, 11B, 11C and 11D. As shown, the support assemblies comprise McPhearson type struts that support independently supported axles 12A, 12B, 12C and 12D. This is shown for reference purposes. The vehicle, including its suspension system, is what is being tested, so that the suspension would be different for different makes of vehicles. Each of the wheel support assemblies 11A–11D would support a wheel and tire indicated at dotted lines at 13A–13D, respectively, but these in testing circumstances, as illustrated in the above-identified patents, the wheels are generally replaced by fixtures shown at 14A-14D that mount onto the respective spindles or axles 12A-12D and which are loaded by a series of actuators operating through linkages that are represented schematically in the present drawings. Such loading could include vertical loading actuator and linkage assemblies 15A-15D; fore and aft or longitudinal load input actuators or assemblies 16A-16D; and lateral load linkage assemblies and actuators represented at 17A-17D. It is understood that the boxes represent actual actuators and linkages that are servocontrolled for inputting programmed test loads to the vehicle, and to simulate such test loads. The loads are generally applied at the location of the tire patch. Suitable controls 19 are used for operating the actuators 15, 16 and 17 in a test program of sequence.

The actuators used for testing are grounded with respect to a supporting surface indicated generally at 20, so that the vehicle is being loaded relative to this supporting surface and the loads are reacted through the suspension system against the weight of the vehicle, and any restraints that are present.

Braking loads also can be applied by actuating the brakes that would normally be coupled to the wheels and tires 13A-13D and which then would affect the loading adaptors or fixtures 14A-14D. In use, the wheel support assemblies 11A-11D are mounted on a vehicle body shown fragmentarily at 23 in FIGS. 1 and 2. A typical vehicle body is shown in FIG. 6, for illustrative purposes. The vehicle body has vertical frame posts 24, such as are around the doors, and a sill 25, which extends longitudinally along the lower side edges of the body on opposite sides thereof. The sill generally is a tubular, formed metal section, shaped similar to that which is shown in FIGS. 2 and 3. The sills form major structural members for carrying shear loads along the sides of the body. A floor pan 26 is also integrally formed with both of the sills and extends across the vehicle body, as shown schematically in FIG. 1.

In order to simulate inertial loading by providing restraints in the directions that inertial loading occurs, a restraint assembly or fixture indicated generally at 30 is provided. The fixture 30 is designed to provide unrestrained vertical, pitch and roll motions of the vehicle body 23, as supported on the wheel supports 11A-11D, to inertially react the inputs of vertical, pitch and roll motions in the same manner as is done on the road. The horizontal loads in the fore and aft direction are reacted through the vehicle center of gravity, so that the same force/moment relationships that occur during inertial reactions on the road are simulated. The fixture or assembly 30 as shown restrains longitudinal motion at the vehicle center of gravity, and all yaw motion is restrained. Lateral motion can be free, fixed or controlled at a desired level, depending on the specific use or test requirement. The lateral motion can be grounded by a servo-controlled actuator or air springs, or the lateral motion can be left unrestrained. In some instances, some damped or controlled longitudinal motion can be permitted.

The fixture or assembly 30 includes a pair of vehicle attachment clamp assemblies 31, one on each side of the vehicle; a moment reaction beam or torque carrying yoke 32 that spans the vehicle on the lower side of the body and which provides supports for the clamp assemblies 31; and motion restraint or control linkages indicated generally at 33, which are coupled together on a base 34. Base 34 is fixed relative to the support surface 20 that provides the mounting or grounding for the actuators used for inputting the loads to the wheel spindles.

The vehicle clamp assemblies 31 include two longitudinally spaced (that is, spaced in direction along the longitudinal axis of the vehicle illustrated at 35) sill clamp means 36,36 on each side of the vehicle. The sill clamp means 36 each comprise two individual clamp members 37,37 which as shown are split clamps having clamp portions 37A and 37B which are formed to have jaws that can be clamped together with suitable cap screws 38 (see FIG. 3 as well). The jaws will clamp onto the sills through an elastomeric lining for each jaw; the elastomeric material 41 is formed to fit against the sills 25 on opposite sides of the vehicle. The clamps means 36, which as shown are arranged in pairs of clamp members 37, are mounted onto a clamp mounting plate 42, through the use of cap screws that are mounted in suitable slots 44 that extend in fore and aft direction. The upper cap screws that clamp the clamp members 37A are permitted vertical movement as well so that the clamping can occur onto the respective sill and then the clamps can be securely fixed onto the clamp mounting plate 42.

Each of the clamp mounting plates 42 has a support brace assembly shown schematically at 45 on the outer side thereof, that is, the side opposite from the vehicle, and the support brace assembly 44 mounteds a pivot bearing block 46 thereon. The yoke or torque beam 32, is a rigid box-shaped reaction beam that spans the vehicle, and is made up of two telescoping tube sections 32A and 32B (as shown, square tubes), which can be adjusted in lateral direction of the vehicle to be tested for accommodating different width vehicle bodies. The yoke 32 has upwardly extending arms 49 on opposite sides thereof that taper upwardly and outwardly. A trunion block 50 is mounted at the upper end of each arm 49. The trunion block 50 includes a pivot pin 51 that fits into a bore in the pivot bearing block 46 on each of the respective clamp mounting plates 42, to pivotally mount both of the clamp mounting plates 42 about a lateral axis indicated at 52. Additionally, the trunion block 50 has longitudinally extending mounting pins 53 on opposite sides thereof that are coaxial. The axis is parallel to the longitudinal axis 35 of the vehicle, and these pins 53 are pivotally mounted at the upper or second ends of the motion control linkages 33. The pivot bearing blocks 46 which receive the pins 51, are vertically adjustable through the use of slots and cap screws. The slots are indicated at 47, on the vertical plates 45 forming parts of the brace members 45.

As can be seen, the reaction or motion control linkages 33 each comprise a scissor linkage having first and second portions 55 and 56. The first end of the linkage 33, that is, the free end of the portion 55, is pivotally mounted to the base plate 34 through the use of a pin 57 passing through the end of the link portion and through suitable bearings 58. The outer (upper) end of the linkage 33, which is at the second end of this linkage and at the outer end of the linkage portion 56, is bifurcated and has a recess 60 that is made to receive the trunion 50 and the upper end of the arm 49, and this linkage end is pivotally mounted onto the pins 53. The linkage portions 55 and 56 have adjacent ends which are pivotally mounted together as at 64, in the midportion of the linkage, to form an intermediate pivot. The fixture 30 is thus made to provide unrestrained vertical motion, but because of the shape of the linkages 33, which are wide in direction of the longitudinal axis, that is, along the axes of pivot of the pins 67, 64 and 53, the linkages 33, as shown prevent movement along the longitudinal axis 35 between the clamp means 36 and the base 34.

Some limited longitudinal restrained motion can be provided between linkages 33 and the base 34 if desired. The motion can be controlled or merely dampened, for example if shafts 57 were able to slide relative to bearings 58, and the motion was controlled. A hydraulic actuator having shafts out each end could have the linkages connected to the actuator body with the rods extending out both ends of the body and mounted in bearings 58. The actuator body could then slide along the piston of the actuator as the linkages 33 shifted longitudinally. Dampening could be provided by an orifice in the piston through which hydraulic oil flowed as the actuator body shifted. This type of structure provides restraint in longitudinal direction.

It also can be seen that pivotal movement about the axis 52, represented by the arrow 52A, is unrestrained, so that any pitching of a vehicle body 23 mounted in the clamp means 36 is permitted, insofar as the fixture 30 is concerned. Any such pitching would be reacted by loads through the axles of the vehicles, and the actuators connected to load such axles, as also controlled or reacted by the support assemblies (struts) 11A–11D.

Likewise, roll of the vehicle about the longitudinal axis is normally unrestrained.

The tendency of a vehicle to twist between the two clamping assemblies 31 is resisted on opposite sides of the vehicle by the yoke 32, which is very rigid in torsion to react moments. The linkage reacts yaw loads, that is, the tendency of the front or rear of the vehicle to move laterally in one direction while the opposite end moves in the other direction. The yoke 32 converts all sill plate loads brought in through the clamp means 36 into pure longitudinal and lateral loads, which are evenly distributed on both sides of the vehicle.

The rigid yoke or beam 32 prevents uneven load distribution and load concentrations at the ends of the clamp means, preventing sill failures due to unrealistic bending loads. Because the box construction of the yoke or reaction beam 32 is adjustable for width, various specimen size requirements can be met.

Further, the yoke arms 49 are connected through the trunions 50 to the linkages 33 by a type of universal joint or gimble connection to permit freedom of pitch of the vehicle. The axes of the pins 53 are parallel to the vehicle longitudinal axis and perpendicular to the pitch axis and the clamp plates are adjusted so that preferably the axis 52 and the center of gravity are on the same horizontal plane. Because the trunions 50 act like gimbles, there is freedom of movement about the roll axis and the linkages 33, which are very rigid box type linkages, allow freedom of motion in the vertical, lateral and roll axes and yet react the longitudinal and yaw loads.

As a modification, shown in FIG. 2, a horizontal load control actuator 70 is used, and this is connected through an actuator rod 71 to a pin 72 that is parallel to the longitudinal axis of the vehicle and parallel to the axis of the pins 53 of the trunion 50 mounted in the arm 49. The actuator 70 is controlled through servovalve controls 73, shown schematically, and can be controlled to react lateral loads at a desired level. The lateral loads act in the direction as indicated by the double arrow 75. If desired, the pin 72 can be connected to a fixed linkage, to air bags or springs, or if desired the lateral loads can be summed and provided to the controls to control the reaction forces provided by the actuator 70.

As shown in FIG. 6, the center of gravity lies along the axis 52 of the pins 51 of the trunions 50. When the vehicle body 23 pitches, because of braking for example, as shown in dotted lines in FIG. 6, the center of gravity of the vehicle which is indicated at 76 will shift upwardly along an arc centered on the axis of pitch. Because the trunions are free to move vertically, this movement is permitted without affecting the tests, but yet the longitudinal loads will come in through the center of gravity because the axes of the pins 53 on opposite sides of the vehicle lie on an axis passing through the center of gravity.

In FIG. 3, a method of providing close fitting clamps having elastomeric jaws with the elastomeric material 41 in place is illustrated.

The clamp in FIG. 3 is shown in an initial position, with the clamp portions 37A and 37B illustrated so that they have clamp jaw portions 80 and 81 that overlie the sill 25 that is to be used. The clamps also have base portions 82 and 83, that mate together and which are clamped against the clamp plate 42.

The base portions 82 and 83 are clamped together with the cap screws 38 to clamp the jaws onto the sill. In an initial step of forming the clamp, a plurality of shims indicated at 85 are placed between the mating or facing surfaces of the base walls 82 and 83 of the clamp portions 37A and 37B so that the edge surfaces of the jaws which are indicated at 80A and 81A are spaced from the sill surfaces a desired amount. The clamping action will be in direction as indicated by the arrow 86, and it is the edges of the jaws that face in those directions, or at least partially in those directions, must be spaced from the sill surfaces. The jaw portions 80 and 81 also have interior receptacles 80B and 81B defined therein by base plates of walls 80C and 81C that form the base of the chambers which are open to and face the sill. When the shims 85 are in place, a quantity of an elastomeric material, such as a suitable room temperature cure urethane, is poured into the chambers 80B and 81B, through a suitable opening such as that shown at 80C, and a sufficient quantity of urethane is forced in to engage the sill surfaces 25 and flow outwardly past the outer ends of the jaws as shown at 88 to insure that there is a filling of the urethane material in the cavities or chambers 80B and 81B that is backed up against the base walls 80C and 81C forming the base of the chambers, so that there are no substantial air bubbles and so that the urethane material seats solidly against the outer surfaces of the sill 25 over onto the floor plate 26.

The sills and the floor plate portions of the vehicle adjacent the sills can be coated with a suitable release coating on which the urethane will not adhere, and once the urethane then cures, after filling, the cap screws 38 are released, the camp portion separated, and the shims 85 are removed. The excess of the urethane can be tunneled away and the material 88 can be tunneled for example then the cap screws can be retightened, and the urethane lining 41 will be used for tightly clamping onto the sill without marring the surface. A close fit is made so that there is not any undue high pressure areas during the clamping. The cap screws holding the clamp portions 37A and 37B onto the clamp plate 42 can then be tightened to hold the clamp member securely. Adjustment of the clamp members in fore and aft direction on the clamp plate 42 can also be made at that time.

This method, including the application of the release coating onto the surfaces of the vehicle body which will be engaged by the room temperature cure urethane, insures that clamps are formed so the sills are not likely to be crushed and yet will be held securely.

Figure 4:
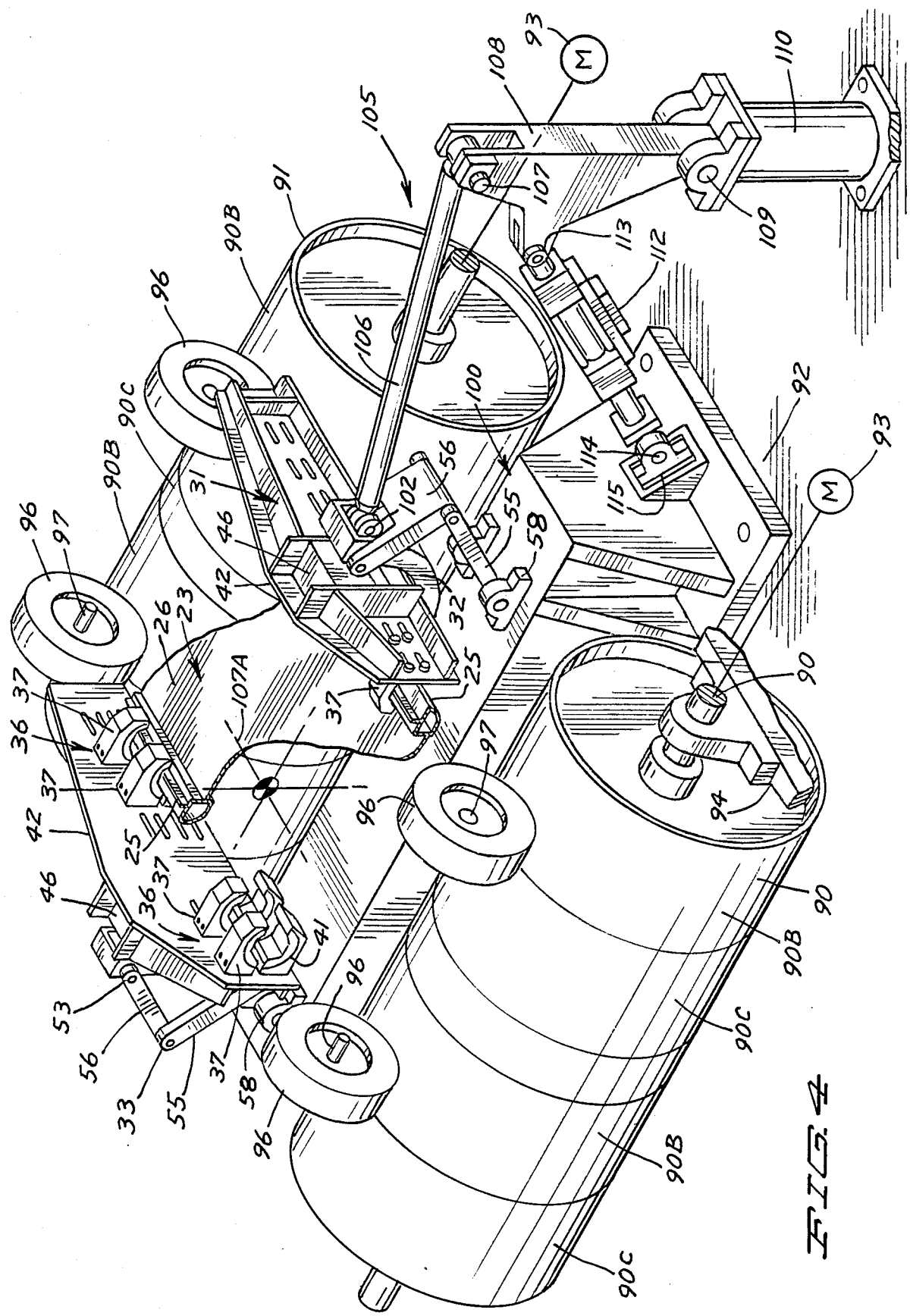
FIG. 4 is a schematic perspective view of a modified restraint system of the present invention used with a rolling drum type tester.

A modified form of the invention shown in FIGS. 4 and 5 is adapted for use where a pair of power driven rolling drums are used for testing a complete vehicle including tires on the wheels. In the form shown in FIG. 4, the clamp assemblies and linkage assemblies are all the same, and the trunion mounts are the same except that there is a lateral input linkage shown. In this form of the invention, there are first and second drums 90 and 91, respectively, which are rotatably mounted with respect to the support surface 92 on suitable bearings and driven with electric motors or other power inputs indicated generally at 93 at desired speeds. The drums 90 and 91 are made so that they can be shifted laterally along the axis of the shafts 90A and 91A, because the drum surfaces will have two different surfaces thereon. For example, a smooth surface portion 90B and 91B can be provided, and a rough surface portion 90C and 91C can be provided for each of the vehicle tires which are indicated generally at 96. The vehicle wheels and tires 96 are mounted onto suitable spindles indicated at 97 that couple to a vehicle body indicated fragmentarily at 23. The vehicle is represented by the same numbers as previously shown, including sills 25.

The tires 96 carry the vehicle loads, and as the drums are rotated and moved or controlled, the vehicle body is restrained through the fixture 30 that is illustrated only schematically.

The fixture 30 includes the clamp assemblies 31, the motion control linkages 33, which are scissor type linkages as before, and a torque carrying yoke or beam 32 which is shown only schematically.

The scissor linkages, however, have the support bearings 58 mounted onto a support base 100 that is raised up above supporting surface 92, to a desired level to restrain the vehicle appropriately at the height that is necessary for running on the drums 90 and 91.

In this form of the invention, a lateral movement control linkage indicated generally at 105 is provided, and it is connected through a link 106, that is pivotally mounted on a pin 107 that has an axis parallel to the axis of the pins pivotally mounting the scissor linkages 33. Thus the mounting axis of pin 107 is parallel to the longitudinal axis of the vehicle which is shown at 107A. The link 106 is a rigid link having rod end bearings at its opposite ends, and it is the opposite end of link 106 from the pin 102 that is connected with the pin 107 to a bell crank 108. The bell crank 108 has a mounting pin 109 mounted onto a support pedestal 110 that is fixed with respect to the surface 92 at a desired level. A servoactuator 112 (a double acting hydraulic actuator) has one end connected to a pin 113 forming an input to the bell crank 108 (it is spaced from the pins 107 and 109) and the opposite end of the actuator 112, as shown the rod end, is connected with a pin 114 to a bracket 115 mounted on the support 100.

The servoactuator 112 is provided with suitable inputs for controlling the lateral position of the vehicle, and in this way the vehicle can be restrained from moving on the drums. The restraint from longitudinal motion is provided with the scissor linkages, and the other motions are free, including pitch, which can occur if the brakes are applied, so that inertial loading can be simulated.

In FIG. 5, a schematic representation is made of a safety interlock for the apparatus of FIG. 4 in case one of the tires 96 goes flat. The tire 96 is mounted on a wheel and a wheel hub 120, which is connected to a suitable spindle 97, and as shown, a strut 121 can be used for mounting the wheel hub. The wheel hub is further supported by an arm 124 that is attached to the vehicle and is connected to the hub. A fixed brace 122 is mounted below the arm 124 with a limit switch 123 thereon positioned so that when a tire goes flat the difference in height of the wheel hub 120 because of the flat tire will actuate the switch 123 and provide a signal to safety interlocks represented schematically at 125 to cause the unit to be shut down and avoid damage to the rim on which the tire is mounted, and/or the drum surface.

When used with rotating drums as shown, the ability to control the longitudinal position permits the vehicle to be mounted onto the drums so that vertical movement, roll, and pitch can be permitted as desired. Also as shown the lateral position or side to side position of the vehicle can be controlled through the use of the lateral control actuators.

Again, the box section scissor linkages 33 are very rigid, so that they will react to loads adequately, and the inertial loading can be simulated on a vehicle body when using the individual actuators at each of the wheel support spindles or axles. Inertial loading, such as when the car is cornering, is capable of being applied in the test sequence.

In summary, the restraint fixtures allow free vertical motion and motion combinations about the vehicle center of gravity including the true vertical motion, pitch and roll. The center of roll is not established by the fixture but remains free unless lateral motion is restrained as shown in option in FIG. 2. There is a fixed position force reaction in longitudinal direction, and also in yaw. As an option, controlled force or displacement reactions in lateral direction can be used and it allows body twists to occur naturally without constraint by the reaction fixture. All of the input forces can be resolved into components and reacted in such a manner as to prevent compression of the vehicle body laterally. The reaction for longitudinal loads is into the door sills. The load can be reacted by brackets connected to the exterior of the door sills, or through the door attachment points. The lateral loads are distributed evenly on both sides of the vehicle body by use of the yoke so that there is no compression of the body and the fixture isolates the bending or moment loads from the vehicle sills.

While the type of loading shown schematically in the prior art can be used, the restraint fixture of the pieces also can be used with other types of loading fixtures for applying simulated operational loads to vehicles.

Although the present invention has been described with reference to preferred embodiments, workers skilled in the art will recognize that changes may be made in form and detail without departing from the spirit and scope of the invention.

What is claimed is:

1. A method of forming a sill clamp for a sill of a vehicle body to be mounted in a testing fixture, said clamp comprising a split clamp member having two clamp portions which at least partially surround a sill to be clamped, said two clamp portions having a separating interface generally perpendicular to the direction of clamping and the clamp portion having a clamp section that is moveable together and apart comprising the steps of:

shimming the split clamp portions apart so that clamp edges facing the sill in the directions of clamping forces are completely spaced from the sill;

providing an interior chamber in the clamp portions facing the sill with the clamp edges open to the chamber;

filling the chamber with a curable elastomeric material that will flow between the clamp edges and the sill in the directions of clamping forces, and permitting the elastomeric material to flow between the sill and adjacent clamp portions; and removing the clamp portion from the sill after the elastomeric material has cured, and adjusting the shims when the clamp portion are again moved together to create the desired forces against the sill through the cured elastomeric material.

2. The method of claim 1 including the step of applying a release coating to the surfaces of the sill and vehicle body adjacent the clamp portions prior to the time the elastomer is provided in the clamp.

3. The method of claim 1 wherein the clamp sections are base members spaced from the sill and are clamped together after shims are removed to provide the clamping forces on the sill.

4. A support and guidance system for vehicles to be tested, wherein the vehicle has a longitudinal axis comprising a fixture to restrain such a vehicle in selected directions positioned at the lateral sides thereof, said fixture including:

a base;

means for securing said vehicle relative to the base; and support means for the means for securing comprising support members mounted to the base relative to which the vehicle will be tested, said support means permitting free movement along an axis in direction perpendicular to said longitudinal axis and restraining movement of the vehicle body parallel to the longitudinal axis.

5. The apparatus as specified in claim 4 wherein said support means comprises a folding linkage pivotally mounted to said base about an axis parallel to the longitudinal axis of the vehicle, said folding linkage including two portions pivotally mounted together between the ends of the folding linkage, and having an opposite end from the first axis pivotally mounted to said means for clamping about an axis parallel to the first axis, said two portions being pivotally mounted together between the ends thereof about an axis parallel to the first axis.

6. The apparatus as specified in claim 5 wherein said means for securing comprises a torque carrying beam spanning a vehicle supported on the means for clamping, and a pair of clamp assemblies on opposite sides of such vehicle, each of said clamp assemblies having two longitudinally spaced clamp jaws for engaging a sill tube of a body of such a vehicle.

7. The apparatus as specified in claim 6 wherein there is a folding linkage on opposite sides of the vehicle, said folding linkage being coupled to said torque carrying beam at the second ends of the linkages.

8. The apparatus as specified in claim 6 wherein the means for securing comprises sets of clamp assemblies, each assembly having a pair of clamps spaced longitudinally, and adapted to engage the sills of a vehicle body to be tested, a clamp plate, said clamp assemblies being mounted onto the clamp plate, and means for pivotally mounting each of said clamp plates to the torque tube on a lateral axis that lies on a horizontal plane passing through the axis of pitch of a vehicle supported on the means for clamping.

9. The apparatus as specified in claim 8 wherein the means for pivotable mounting each clamp plate about a lateral axis is unrestrained to permit free pitch motion of a vehicle mounted on the means for clamping about such axis.

10. The apparatus as specified in claim 8 and means connected to the clamp assemblies for controlling lateral-motion of a vehicle body mounted by the clamp assemblies.

11. The apparatus as specified in claim 4 and a rigid moment resisting yoke member extending laterally across a vehicle, supported on the means for clamping, and having upwardly extending arms on opposite sides of a vehicle supported on the means for clamping and are supported for vertical motion by a scissor linkage on each side of such body, said scissor linkage being mounted to resist loads on the such a vehicle, body in longitudinal direction and to resist any yaw motion of such vehicle body.

* * * * *